UNITED STATES PATENT OFFICE.

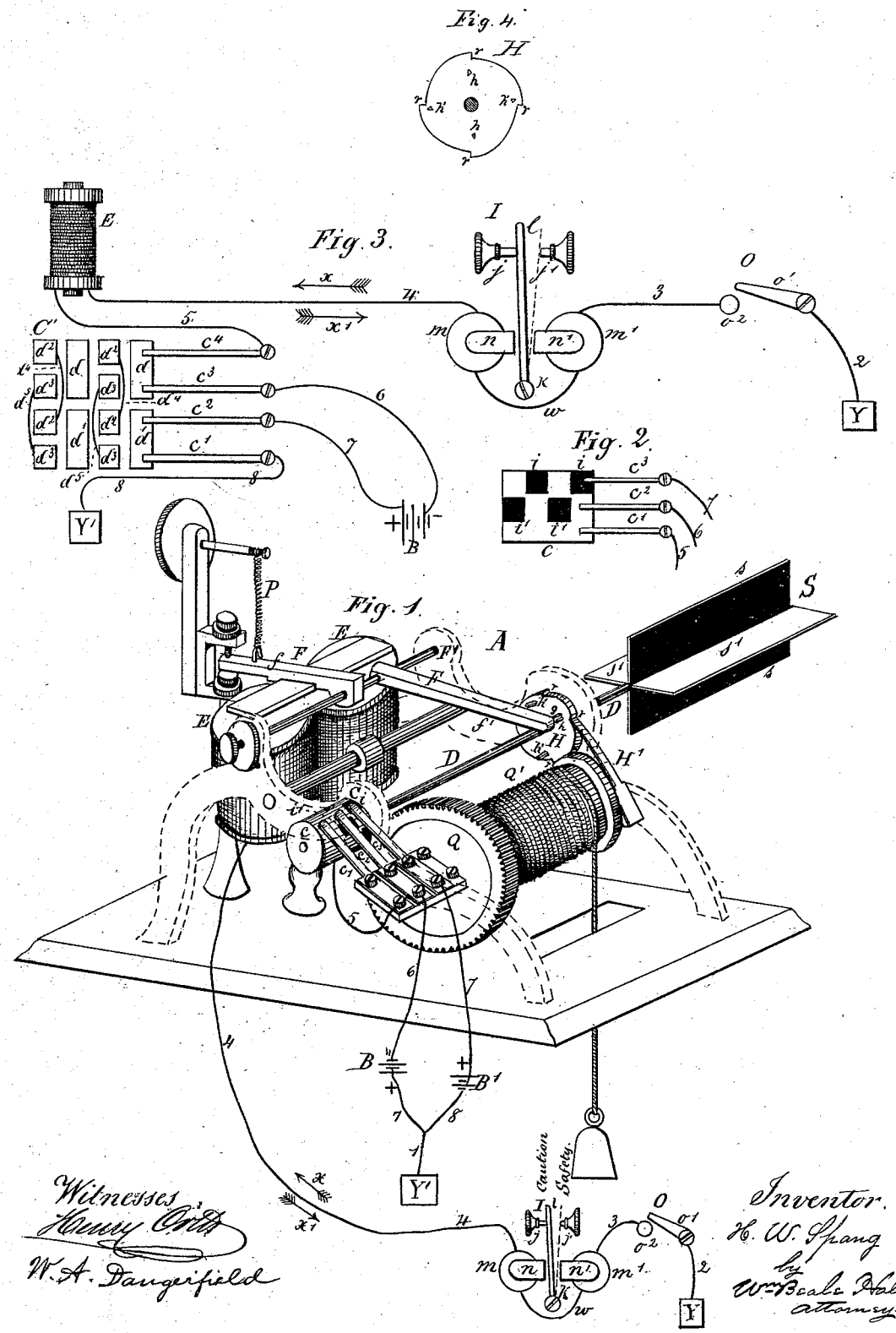

HENRY W. SPANG, OF READING, PENNSYLVANIA.

IMPROVEMENT IN ELECTRIC RAILROAD-SIGNALS.

Specification forming part of Letters Patent No. 168,058, dated September 21, 1875; application filed December 22, 1873.

*To all whom it may concern:*

Be it known that I, HENRY W. SPANG, of Reading, in the county of Berks and State of Pennsylvania, have invented an Electric Signal Apparatus for Railways, of which the following is a specification:

The object of my invention is to provide a method whereby a semaphoric or other signal may be operated at a distance by means of electro-magnetism, and the movements of said signal repeated back, and indicated or recorded at or near the point from which it is operated, by means of a single circuit of conductors. It consists in arranging a primary signal of any suitable construction, together with a secondary signal or indicator, which is actuated or controlled by a polarized electro-magnet, at any required distance from each other, in connection with a single circuit of conductors, and in combining, with said primary signal, a circuit-changer which shall cause the battery-current to be reversed whenever the position of the primary signal is changed, and thereby enable the movements of the said primary signal to be indicated or recorded at any point in the circuit by means of a polarized electro-magnet or other equivalent electrical device or devices. It consists, also, in an improved signal apparatus applicable to the primary signal before mentioned.

In operating an electric signal at a distance, or when the said signal is so situated that it cannot be seen by the person who operates it, it is necessary for its movements to be repeated by a secondary signal or indicator at or near the point where the operator or signal-man is stationed, in order that he may be able to know whether or not the primary signal has performed its function.

In the accompanying drawing, Figure 1 represents a primary signal and an indicator in connection with two galvanic batteries; Fig. 2, the circuit-changer; and Fig. 3 shows a modification of the circuit-changer in connection with one galvanic battery. Fig. 4 is a side view of the brake or retarding wheel.

A is the primary signal apparatus, in which the semaphoric signal S consists of four rectangular frames or wings, $s\ s\ s'\ s'$, alternately of contrasting colors, to indicate "safety" and "caution" or "danger," which are placed at right angles to each other on a shaft, D. On said shaft D is a pinion, $d$, which meshes with a spur-gear wheel, Q, on the shaft of a drum, Q'. The connection between the drum Q' and the spur-gear wheel Q is made, in the usual manner, by means of a ratchet-wheel fixed to the drum and a pawl pivoted to the gear-wheel, said pawl taking into the teeth of said ratchet. The drum is rotated, in the ordinary manner, by a cord and weight, or by a spring. E is an electro-magnet, the armature of which is attached to the short arm $f$ of bent lever F, the fulcrum of which is at F'. To the end of the long arm $f'$ of lever F is attached a detent, $g$, which engages successively with four pins, $h\ h\ h'\ h'$, on the face of a notched wheel, H, on shaft D. A detent-spring, H', bears against the notched periphery of wheel H, and prevents any reverse motion of said wheel, and also, owing to the shape of the notches in said wheel, causes the speed of the wheel H, shaft D, and signal S to slacken as the signal approaches the joint of full display, thereby preventing jarring when the rotation of the parts mentioned is stopped by detent $g$ engaging with one of the pins on the face of wheel H. The notches $r$ in the periphery of this wheel H have one side cut on a line curving from the periphery toward the center, and terminating at a shoulder, from the top of which the next notch is commenced, so that when the end of spring H' rests at the bottom of a notch the tension of said spring is somewhat relaxed, and as the wheel turns the spring is lifted by the curved surface of the notch, and its tension, of course, increased as it approaches the top of the notch, producing the slackening of speed of rotation of the signal, as above set forth. The pins on the face of wheel H are so arranged that when end $f'$ of lever F is depressed, detent $g$ is in the path of pins $h\ h$, and, when elevated, it (said detent) is in the path of pins $h'\ h'$. C is a circuit-changer, consisting of a metallic cylinder, $c$, arranged upon shaft D, and having its periphery inlaid with plates $i\ i'$, of hard rubber or other insulating material, which, as said cylinder rotates, break metallic contact between the cylinder and metallic springs $c^2\ c^3$, which bear upon its periphery when they come under the ends of said springs. A third spring, $c^1$, bears upon a portion of the periphery of the cylinder $c$, which is not inlaid with insulating-plates, but has continuous metallic contact with spring $c^1$. The inlaid insulating-plates $i$ $i'$ are flush with the surface of the cylinder, and so arranged that when metallic connection is completed between springs $c^1$ and $c^2$ it will be broken between $c^1$ and $c^3$, and when completed between $c^1$ and $c^3$ it will be broken between $c^1$ and $c^2$. The whole is so arranged that when the electric circuit is opened, and electro-magnet E is not charged, the spring P, which is attached to short arm of lever F, will raise said short arm, and depress the long arm of the lever, and thereby cause detent $g$ to release a pin upon the face of the wheel H, and allow said wheel, shaft D, and signal S to make a quarter-revolution, when another pin on the face of wheel H is caught by detent $g$, the signal S being thus stopped and held in position to show a "caution" or "danger" signal. At this point the circuit-changer makes metallic connection between springs $c^1$ and $c^2$, and breaks it between $c^1$ and $c^3$.

When the magnet E is charged, the armature upon the short arm of lever F is attracted, and will depress the short arm and raise the long arm of said lever, and cause detent $g$ to again release a pin upon the face of wheel H, and allow said wheel, shaft D, signal S, and cylinder $c$ to make another quarter-revolution, and another pin to be caught by detent $g$. The signal S is now in position to indicate "safety," and the circuit-changer has just completed metallic connection between springs $c^1$ and $c^3$, and broken it between $c^1$ and $c^2$. I is an indicator, consisting of two straight electro-magnets, $m$ $m'$, the coils of both of which are formed of the same wire $w$, and their iron cores, to which are attached poles $n$ $n'$, are polarized, as, also, is the lever $l$, by being attached to a permanent magnet. The lever $l$ vibrates on its fulcrum $k$, and poles $n$ $n'$ and screws $j$ $j'$ are so adjusted that said lever is nearer pole $n$ than $n'$, and is attracted by pole $n$ when the circuit is open or current flows in the direction of arrow (⟵) $x$, and then points to the word "caution," and when the current flows in the direction of the arrow (⟶) $x'$ the polarity of poles $n$ $n'$ will be changed, and the lever $l$ will take the position indicated by the dotted line in the drawing, and point to the word "safety." B B' are conventional representations of galvanic batteries. O is a circuit closer and breaker, consisting of the metallic lever $o^1$ and the metallic plate $o^2$, the lever being pivoted in such position that it may be swung into or out of contact with plate $o^2$. Y Y' are metallic plates embedded in the earth, so as to make good electrical connection.

When the circuit closer and breaker O is open, as shown in Fig. 1, the circuit of battery B and battery B' is broken, and both the caution-wings $s$ $s$ (usually red) of the primary signal S and the indicator I remain in the position shown in the drawing, and indicate "caution." The primary signal apparatus A and batteries B B' are a mile, more or less, distant from the indicator I and circuit closer and breaker O. If it is desired to change the position of the primary signal S, so that the two white or safety wings $s'$ $s'$ of the signal will be seen, the operator or signal-man closes the circuit by causing lever $o^1$ to contact with plate $o^2$. The current of battery B will then flow from the positive (+) pole thereof, over wire 1 and earth-plate Y', to the earth, and the complementary current will flow from the earth, over earth-plate Y, wire 2, lever $o^1$, metallic plate $o^2$, wire 3, magnet $m'$, wire $w$, and magnet $m$ of the indicator I, wire 4, wire coils of electro-magnet E, wire 5, spring $c^1$, cylinder $c$, spring $c^2$, and wire 6, to the negative (—) pole of battery B, thereby charging the iron cores of magnet E, and attracting the armature upon lever F, causing detent $g$ to release a pin, $h$, upon the face of wheel H, and allowing said wheel, shaft D, signal S, and cylinder $c$ to make a quarter-revolution, as hereinbefore described, bringing the signal S into position to display the white or safety wings $s'$ $s'$.

Immediately after the cylinder $c$ commences to make the said quarter-revolution the metallic connection between the springs $c^1$ and $c^2$ is broken, owing to spring $c^2$ contacting with the insulating-plate $i'$, and metallic connection is completed between springs $c^1$ and $c^3$, owing to spring $c^3$ contacting with the metal periphery of cylinder $c$, and thus the circuit of battery B is broken, and that of battery B' closed, the current from the latter flowing from the positive pole thereof, over wire 7, spring $c^3$, cylinder $c$, spring $c^1$, wire 5, coils of electro-magnet E, wire 4, magnet $m$, wire $w$, and magnet $m'$ of indicator I, wire 3, metallic plate $o^2$, lever $o^1$, wire 2, earth-plate Y, to the earth, and the complementary current will flow from the earth, over earth-plate Y', wires 1 and 8, to the negative (—) pole of battery B', still charging the iron cores of magnet E, (which still attract the armature upon lever L, as heretofore explained,) and at the same time changing the polarity of poles $n$ $n'$ of magnets $m$ $m'$, and causing lever $l$ to contact with screw $j'$, and point to the word "safety," to which it will continue to point as long as said circuit is closed, and the primary signal indicates safety; but as soon as lever $o^1$ is moved off conducting-plate $o^2$ the circuit will be broken, and the spring P will cause the short arm of lever F to be again raised, and the long arm depressed, releasing pin $h'$, allowing notched wheel H, cylinder $c$, shaft D, and signal S to make another quarter-revolution, the said signal then indicating "caution" or "danger." When the parts arrive at this position metallic connection is broken between springs $c^1$ and $c^3$, owing to spring $c^3$ resting upon insulating plate $i$, and is completed between springs $c^1$ and $c^2$, owing to spring $c^2$ resting upon the metallic portion of the periphery of cylinder $c$. The circuit being broken, owing to lever $o^1$ not contacting with plate $o^2$, the lever $l$ of indicator I will be attracted by pole $n$, (being adjusted nearer pole $n$ than $n'$,) and caused to indicate or point to "caution," as heretofore explained.

In the modification shown in Fig. 3 one galvanic battery is employed, and the circuit-changer $C'$ consists of four springs, $c^1 c^2 c^3 c^4$, insulated from each other, which have intermittent contact with metallic strips $d\ d^1\ d^2\ d^3$, which are separated from each other, and are fastened upon the periphery of a wooden cylinder C, which is mounted upon and revolves with shaft D. Strips $d^2\ d^2$ are connected together by wire or conductor $d^4$, and strips $d^3\ d^3$ by wire or conductor $d^5$. When the circuit-closer is open, as shown in Fig. 3, (lever $o^1$ and plate $o^2$,) the springs $c^1 c^2$ contact with metallic strip $d^1$, and springs $c^3\ c^4$ with strip $d$, and when circuit is closed by causing lever $o^1$ to contact with metallic plate $o^2$, the current of battery B flows from the positive + pole thereof, over wire 7, spring $c^2$, metallic strip $d^1$ spring $c^1$, wire 8, earth-plate $Y'$, to the earth, and the complementary current will flow from the earth to earth-plate Y, over wire 2, lever $o^1$, plate $o^2$, wire 3, magnet $m'$, wire $w$, magnet $m$ of indicator I, wire 4, electro-magnet E, wire 5, spring $c^4$, strip $d$, spring $c^3$, and wire 6, to the negative (−) pole of battery B, thereby charging magnet E, and allowing the signal S and wooden cylinder $C'$ upon shaft D to make a quarter-revolution, as hereinbefore described, and show safety-wings $s'\ s'$, and also cause the springs $c^1\ c^3$ to contact with the metallic strips $d^3\ d^3$, and springs $c^2\ c^4$ to contact with metallic strips $d^2\ d^2$. When these contacts are made the electric current flows from positive + pole of battery B, over wire 7, spring $c^2$, strip $d^2$, wire $d^4$, strip $d^2$, spring $c^4$, wire 5, electro-magnet E, wire 4, magnet $m$, wire $w$, and magnet $m'$ of indicator I, wire 3, metallic plate $o^2$, lever $o^1$, wire 2, and earth-plate Y, to the earth, and the complementary current will flow from the earth to the earth-plate $Y'$, wire 8, spring $c^1$, metal strip $d^3$, wire $d^5$, strip $d^3$, spring $c^3$, and wire 6, to the negative (−) pole of the battery, thus still charging magnet E, and holding signal S at "safety," and at the same time changing the polarity of poles $n\ n'$ of the magnets $m\ m'$ of indicator I, and causing lever $l$ to contact with screw $j'$, and point to "safety," as heretofore explained.

Instead of the devices shown and described for changing circuit, any other equivalent devices can be employed in connection with shaft D, signal S, or any part of signal apparatus A.

Instead of lever $l$ of indicator I pointing to the words "caution" and "safety" it can be employed to operate a semaphoric or other signal directly, or by means of a secondary circuit from an additional battery; and, instead of a polarized electro-magnet and a semaphoric or other signal, a galvanometer or any other suitable electrical apparatus can be employed to show the direction of the battery-current, and thereby indicate the position of the primary signal.

I do not confine myself to any particular primary signal apparatus, nor to any arrangement of battery or batteries, or devices for changing circuit, and for indicating the direction of battery-current; but

I claim, broadly—

1. The combination of a primary signal and a secondary signal or indicator, included in or operated by the same circuit of electrical conductors, when the movements of the secondary signal are dependent upon or controlled by the reversal of a battery-current through said circuit, effected by the movement of the primary signal, substantially as herein set forth.

2. The combination of primary signal S, circuit-changer C, one or more galvanic batteries, intermediate conductors, and a polarized electro-magnet, which operates or controls a secondary signal or indicator, substantially as described.

3. The combination of shaft D, signal S, spring $H'$, and wheel H, having in its periphery the curved faced notches $r$, substantially as and for the purpose set forth.

In testimony whereof I hereunto sign my name in presence of two subscribing witnesses.

HENRY W. SPANG.

Witnesses:
F. H. GARTLAN,
F. N. BOYER.